United States Patent
Meyer-Graefe

(10) Patent No.: US 11,022,954 B2
(45) Date of Patent: Jun. 1, 2021

(54) TECHNIQUES FOR PROVIDING A SECURED CONTROL PARAMETER FOR MULTI-CHANNEL CONTROL OF A MACHINE

(71) Applicant: Phoenix Contact GmbH & Co. KG, Blomberg (DE)

(72) Inventor: Karsten Meyer-Graefe, Schloss Holte-Stukenbrock (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 0 days.

(21) Appl. No.: 16/520,777

(22) Filed: Jul. 24, 2019

(65) Prior Publication Data

US 2020/0033832 A1    Jan. 30, 2020

(30) Foreign Application Priority Data

Jul. 27, 2018   (DE) .................... 10 2018 118 243.0

(51) Int. Cl.
*G05B 19/4063* (2006.01)
*H04L 29/08* (2006.01)
*H04W 4/50* (2018.01)

(52) U.S. Cl.
CPC ......... *G05B 19/4063* (2013.01); *H04L 67/10* (2013.01); *H04L 67/12* (2013.01); *H04W 4/50* (2018.02); *G05B 2219/34465* (2013.01)

(58) Field of Classification Search
CPC ...... G05B 19/4063; G05B 2219/34465; G05B 9/03; G05B 2219/33104; H04W 4/50; H04L 67/10; H04L 67/12
See application file for complete search history.

(56) References Cited

U.S. PATENT DOCUMENTS

| 2009/0140872 A1* | 6/2009 | O'Neal | ................... G05B 9/03 340/679 |
| 2016/0087933 A1* | 3/2016 | Johnson | ............ H04W 12/0023 709/245 |
| 2016/0205180 A1* | 7/2016 | Jan | ......................... H04L 67/42 709/203 |

FOREIGN PATENT DOCUMENTS

| DE | 11 2008 003 241 T5 | 10/2010 |
| DE | 20 2012 000 084 U1 | 5/2012 |

* cited by examiner

*Primary Examiner* — Tejal Gami
(74) *Attorney, Agent, or Firm* — Holland & Hart LLP

(57) ABSTRACT

The present disclosure relates to a provisioning server for providing a secured control parameter for multi-channel control of a machine using a plurality of distributed controls that output single-channel control parameters. The provisioning server includes a first communication interface configured to receive a plurality of single-channel control parameters from the plurality of distributed controls, a processor configured to compare the received single-channel control parameters and output one of the received control parameters as the secured control parameter if a threshold number of the single-channel control parameters are in agreement, and a second communication interface configured to send the secured control parameter to the machine via a communication network.

20 Claims, 4 Drawing Sheets

TECHNIQUES FOR PROVIDING A SECURED CONTROL PARAMETER FOR MULTI-CHANNEL CONTROL OF A MACHINE

CROSS-REFERENCE TO RELATED APPLICATION

This application claims the benefit of German patent application No. 10 2018 118 243.0, filed 27 Jul. 2018 by the present Applicant, and entitled "Techniken zur Bereitstellung eines abgesicherten Steuerungsparameters zur mehrkanaligen Steuerung einer Maschine," the entire disclosure of which is incorporated by reference herein.

FIELD OF THE DISCLOSURE

The present disclosure relates to techniques for providing a secured control parameter for multi-channel control of a machine, in particular using a plurality of distributed controls that output single-channel control parameters.

BACKGROUND

Redundancy and diversity are a known principle in the field of safety engineering. They are often the basis for the construction of safe computer architectures. The higher the risk of an error or the extent of an error, the stronger the measures that have to be taken.

Known safety controls are components that have been developed in accordance with International Electrotechnical Commission (IEC) 61131-3 or -6, IEC 61508 or International Organization for Standardization (ISO) 14849. Two basic approaches for their construction are known:
   a) Redundant architecture of at least two channels with a homogeneous or diversitarily redundant structure;
   b) Single-channel architecture with an additional diagnostic channel.

Common to both architectures is that special measures have to already be observed during the specification. These measures have to be implemented consistently throughout the entire development process up to the production of the safety controls. In terms of their technical complexity, these measures and the multi-channel structure quickly cause the costs for the safety controls to skyrocket.

SUMMARY

The object of the present disclosure is to create an easy-to-implement concept for an improved safety control.

This object is achieved by the subject matters having the features according to the independent claims. Advantageous examples of the present disclosure are the subject matter of the dependent claims, the description and the drawings.

One fundamental idea of the disclosure is the use of at least two different, i.e. diversitary, control platforms, and substantially synchronising their processing such that at least the first occurring error cannot affect the safety-relevant process.

According to a first aspect, the object is achieved with a provisioning server for providing a secured control parameter for multi-channel control of a machine using a plurality of distributed controls that output single-channel control parameters, wherein the machine comprises a control unit that generates a control command for controlling the machine on the basis of the secured control parameter, comprising: a first communication interface, which is designed to receive a plurality of single-channel control parameters from the plurality of distributed controls; a processor, which is designed to compare the received single-channel control parameters with one another, wherein the processor is designed to output a received control parameter as the secured control parameter if a number of the single-channel control parameters are in agreement; and a second communication interface, which is designed to send the secured control parameter to the machine via a communication network.

Such a provisioning server makes it possible to achieve the technical advantage of a single-channel architecture having diversitary redundancy, i.e. the construction of the controls can be simple, because they only have to deliver single-channel control parameters. Diversitary redundancy can be achieved by using several such controls, which ensures a correspondingly high degree of safety without requiring a multi-channel architecture. The advantage is therefore that at least two different, i.e. diversitary, control platforms are used, and their processing is substantially synchronised such that at least the first occurring error cannot affect the safety-relevant process.

In an advantageous example of the provisioning server, the processor is designed to output a received control parameter as the secured control parameter if all the single-channel control parameters are in agreement, or wherein the number of single-channel control parameters that have to be the same is predetermined by a specified threshold value, in particular a percent threshold value.

Such a provisioning server makes it possible to achieve the technical advantage that, in the first case, a particularly high level of safety can be realised because all the single-channel control parameters have to be the same. In the second case, the level of safety can be flexibly adjusted, because not all, but only a specific number of the single-channel control parameters have to be the same.

In an advantageous example of the provisioning server, the first communication interface is a wired communication interface having connection ports, in particular USB ports, to connect the plurality of distributed controls; or a wireless communication interface for wireless communication with the distributed controls via a communication network, in particular via the communication network.

Such a provisioning server makes it possible to achieve the technical advantage that, in the first case, the controls can be connected to the connection ports of the first communication interface in a particularly easy manner, as a result of which the individual controls can easily be exchanged. In the second case of the wireless communication interface, the exchange of controls can even be effected purely automatically without manual intervention, so that there is no need for service personnel. For example, in the event of a malfunction of a control, the processor can automatically connect a different control to the first communication interface.

In an advantageous example of the provisioning server, the second communication interface is designed to receive a request signal to send the secured control parameter from the machine via the communication network and, in response to receiving the request signal, send the secured control parameter to the machine via the communication network.

Such a provisioning server makes it possible to achieve the technical advantage that the signal flow over the second communication interface is reduced, because a permanent transmission of the secured control parameter is not necessary; transmission is necessary only at the request of the machine. In this case, the machine can be realised as a communication master or safety master, which independently checks its functions and obtains secured control parameters from the provisioning server, e.g. by downloading the corresponding secured control parameter.

In an advantageous example of the provisioning server, the second communication interface is designed to send a provisioning signal to the machine, which indicates the provisioning of the secured control parameter.

Such a provisioning server makes it possible to achieve the technical advantage that, in each case, the machine is informed that a secured control parameter is available on the provisioning server. The machine can then plan its synchronisation process or the download of the secured control parameter accordingly.

In an advantageous example of the provisioning server, the second communication interface is a wireless communication interface or a wired communication interface.

Such a provisioning server makes it possible to achieve the technical advantage that the provisioning server can be flexibly connected to different communication networks. Different paths over different communication networks can furthermore be used to increase the safety of the process, if, for example, one of the paths over the communication network is interrupted or disrupted.

In an advantageous example of the provisioning server, the plurality of distributed controls includes an Arduino PC or a Raspberry Pi processor to provide the plurality of single-channel control parameters.

Such a provisioning server makes it possible to achieve the technical advantage that these computer platforms are based on simple hardware, which can be realised in a cost-effective and technically simple manner. This means that high safety requirements can already be realised by using simple hardware for the controls.

In an advantageous example of the provisioning server, the processor is designed to transmit a message to a diagnostic device if there is no agreement among a number of the single-channel control parameters.

Such a provisioning server makes it possible to achieve the technical advantage that the processor is informed about the status of the respective controls and can assess whether a control deviates from the other controls, so that, if appropriate, it (or the diagnostic device) can take error measures, such as the replacement of faulty controls, for example.

In an advantageous example of the provisioning server, the first communication interface is designed to receive the plurality of single-channel control parameters from the plurality of distributed controls over a specified reception time window.

Such a provisioning server makes it possible to achieve the technical advantage that the controls can be efficiently synchronised with one another. A control having to cover a particularly long distance until its single-channel control parameter arrives at the provisioning server, for example, can be compensated for with a correspondingly long time window for receiving the control parameter. The reception time window can also be used to carry out a time averaging of the corresponding single-channel control parameters, so that the mean value provides greater reliability with respect to spikes or short-term failures on the line.

In an advantageous example of the provisioning server, the plurality of distributed controls are assigned to different computer platforms and coupled to the first communication interface in an interchangeable manner.

Such a provisioning server makes it possible to achieve the technical advantage that the safety system can be constructed in a flexible manner, which simplifies the requirements for the hardware. Different hardware can be used for the respective controls, so that the controls do not have to be permanently adapted to one another. The controls can also comprise different software versions, for example.

In an advantageous example of the provisioning server, the processor is designed to decouple the associated controls from the first communication interface if there is no agreement among a number of the single-channel control parameters and replace them with other controls.

Such a provisioning server makes it possible to achieve the technical advantage that the processor can efficiently check and maintain the safety system, so that safety is always at the required level.

In an advantageous example of the provisioning server, the plurality of distributed controls have a safety-relevant operating system which satisfies a safety function, in particular the specifications of the IEC 61131-2 standard with respect to interference immunity and errors.

Such a provisioning server makes it possible to achieve the technical advantage that the relevant safety functions (e.g. according to the IEC 61131-2 standard) are met and the safety system therefore complies with the corresponding CE certification.

Part 2 of the IEC 61131 standard (abbreviated: IEC 61131-2) specifies requirements regarding the interference immunity of the control hardware and the indicated errors and testing instructions. Compliance with Part 2 of the IEC 61131 standard is a minimum requirement to even be used in an industrial setting. Control hardware that meets all requirements is considered safe in terms of the conformity assessment and for CE marking (from Wikipedia).

Part 6 of the standard series (IEC 61131-6) is more relevant for safe controls (the totality of the hardware and/or software executing the safety function), or even better the standards IEC61508, IEC61511, IEC62061, ISO13849 etc.

The distributed controls, on the other hand, have to at least comply with the 61131-2 standard, which, however, is not a safety standard. For this reason, it does not matter if said controls remain inexpensive.

In an advantageous example of the provisioning server, the plurality of distributed controls are realised on the basis of mobile phone hardware or are realised as mobile communication terminals or can be connected to mobile communication terminals.

The advantage of this is a particularly simple realization. The safety system can be realised with mobile phones or smartphones, for example, that are connected to one another via the cloud. Since these are available at ever lower cost, the effort required to install the safety system is reduced.

According to a second aspect, the object is achieved with a control system, comprising: a provisioning server according to the first aspect; and a plurality of distributed controls, which are designed to send a plurality of single-channel control parameters to the provisioning server.

Such a control system makes it possible to achieve the technical advantage of a single-channel architecture having diversitary redundancy, i.e. the construction of the controls can be simple, because they only have to deliver single-channel control parameters. Diversitary redundancy can be achieved by using several such controls, which ensures a correspondingly high degree of safety without requiring a multi-channel architecture. The advantage is therefore that at least two different, i.e. diversitary, control platforms are used, and their processing is substantially synchronised such that at least the first occurring error cannot affect the safety-relevant process.

According to a third aspect, the object is achieved with a method for transmitting a secured control parameter to a machine via a communication network, comprising: receiving a plurality of single-channel control parameters from a plurality of distributed controls; comparing the received single-channel control parameters with one another; output of a secured control parameter if a number of the single-channel control parameters are in agreement; and transmission of the secured control parameter to a machine via a communication network.

Such a method makes it possible to achieve the technical advantage of a single-channel architecture having diversitary redundancy, i.e. the construction of the controls can be simple, because they only have to deliver single-channel control parameters. Diversitary redundancy can be achieved by using several such controls, which ensures a correspondingly high degree of safety without requiring a multi-channel architecture. With said method, at least two different, i.e. diversitary, control platforms can be used, and their processing can substantially be synchronised such that at least the first occurring error cannot affect the safety-relevant process.

It further achieves the technical advantage that the method can easily be used in an automation system.

According to a third aspect, the object is achieved with a computer program comprising a program code for carrying out such a method when the program code is executed on a computer.

The computer program can easily be realised on a provisioning server according to this disclosure.

BRIEF DESCRIPTION OF THE DRAWINGS

Further design examples will be explained with reference to the accompanying drawings.

DETAILED DESCRIPTION

The safety architectures presented below can be used using the "cloud". The so-called "cloud" refers to distributed network and/or database resources, which include outsourced tasks such as the control of information, for example.

One advantage of the cloud is that not only data processing can be carried out there, but that it is also possible to realise database functions. As a result, a distributed memory can be realised.

According to the present disclosure, this property is used for the control, in particular the safety-relevant control, of machines, which can be spatially distributed.

The safety architectures presented below can be based on the standards IEC 61508, IEC 61131-6, ISO13849, IEC 62061, IEC 61511, etc. These standards define so-called safety functions that are provided by a safety system (in this case a provisioning server, control, or input and output components). The 61131-2 standard, on the other hand, only places requirements on the industrial suitability (EMC, environmental effects, etc.). It is not a safety standard but rather a PLC standard.

The safety requirement level used in the following is a term from the functional safety field and is also referred to in the international standardisation according to IEC 61508/IEC61511 as a safety level or safety integrity level, (SIL). It is used to assess electrical/electronic/programmable electronic systems in terms of the reliability of safety functions. The safety-oriented design principles, that have to be maintained in order to minimise the risk of a malfunction, are the result of the targeted level.

The controls presented in the following can be based on simple computer platforms or single-board computers, such as Raspberry Pi or Arduino.

The Raspberry Pi is a single-board computer developed by the British Raspberry Pi Foundation. The computer contains a Broadcom one chip system with an ARM microprocessor. Depending on the model, its sales price is between about 5 and 35 US dollars. In particular customized Linux distributions with a graphical user interface are used as the operating system. The start process is usually carried out by a removable SD memory card as the internal boot medium.

The Arduino is a physical computing platform consisting of software and hardware. Both components are open source. The hardware consists of a simple input/output board with a microcontroller and analogue and digital inputs and outputs. The development environment is based on processing and is also intended to make it easier for the less technically savvy to access the programming and the microcontrollers. The programming itself is carried out in a C or C++-similar programming language, whereby technical details, such as header files, are largely hidden from the users and extensive libraries and examples simplify the programming. Arduino can be used to control separate interactive objects or interact with software applications on computers.

Figure 1:
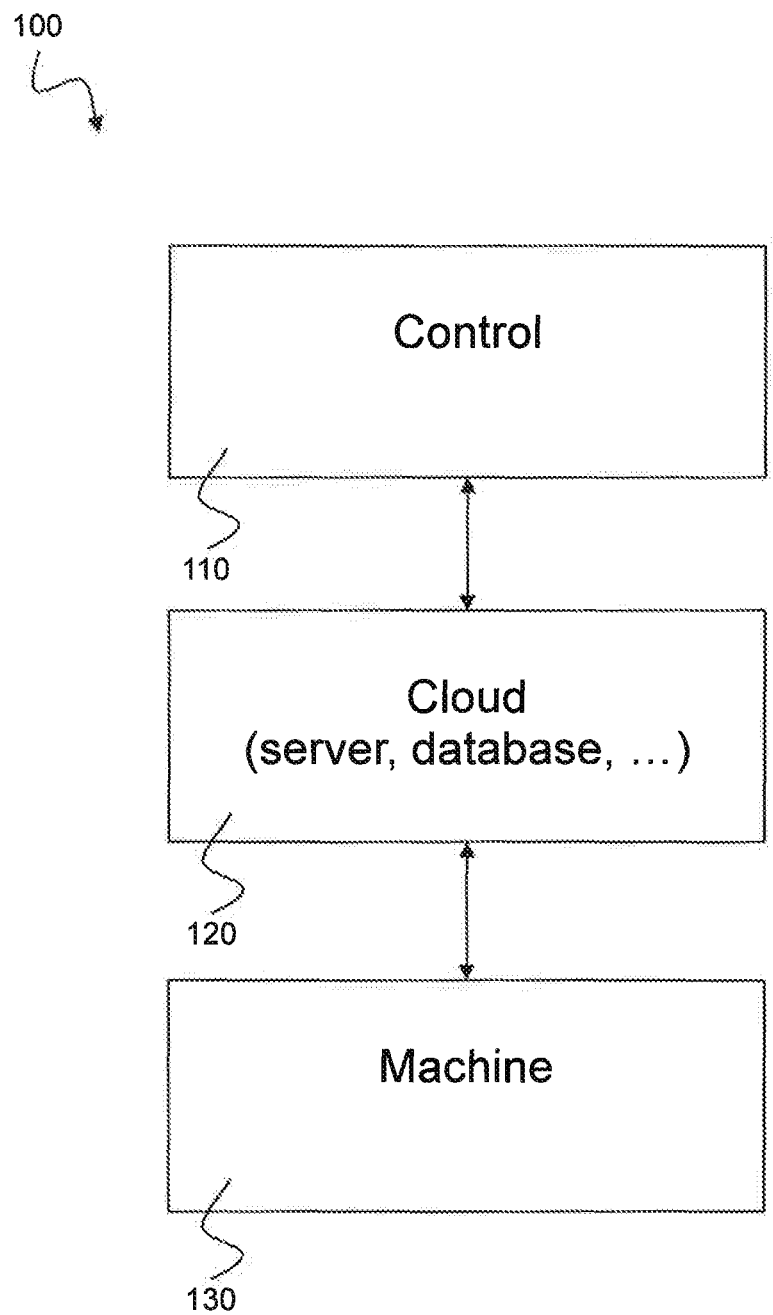
FIG. 1 is a schematic illustration of a safety system 100 for controlling spatially distributed machines.

FIG. 1 shows a schematic illustration of a safety system 100 for controlling spatially distributed machines with a control 110, a cloud 120 and machine(s) 130 according to one example.

The safety system 100 comprises a control 110, which is connected to one or more spatially distributed machines 130 via the cloud 120, e.g. a server or database. The control 110 transmits, for example via a secured database connection, a function to be carried out by the machine 130, in particular a safety-relevant function, such as emergency stop, for example, a control command, or a control value. This function is stored in the cloud 120, for example in a database that can be accessed via a network. The cloud 120 makes the function available to the machine for retrieval.

The machine 130 can retrieve the function from the cloud 120 and execute it. This retrieval can be carried out on the basis of rules, for example at fixed times or via a control specification or as the result of an event. The cloud 120 can furthermore provide the machine 130 with information about the function. Alternatively, or additionally, the function can be realised on the machine 130 itself, and only receive or retrieve values from the cloud 120. This means that not only secured parameters, but also, if appropriate, complete control functions are transmitted to the machine 130.

In one example, the cloud 120 can be designed to check the control value or control command transmitted by the control 110, for example compare it to a reference value. If the checked value is plausible, it is made available for retrieval by the machine 130. Otherwise, the control value or control command is discarded.

In one example, the cloud can emulate the behaviour of the machine with the new control value. If the emulation does not result in a critical state, such as a too high speed, for example, the output is approved. The emulation can be based on models that emulate the behaviour of the machine (e.g. via state transitions, a Petri net, etc.).

With the aforementioned architecture 100, another diagnostic channel can be realised via another cloud connection. Via this channel, the machine 130 can transmit diagnostic values generated by the execution of a diagnostic function to the cloud 120. The cloud 120 can make the diagnostic values available for retrieval, for example by the control 110 or by another entity.

Figure 2:
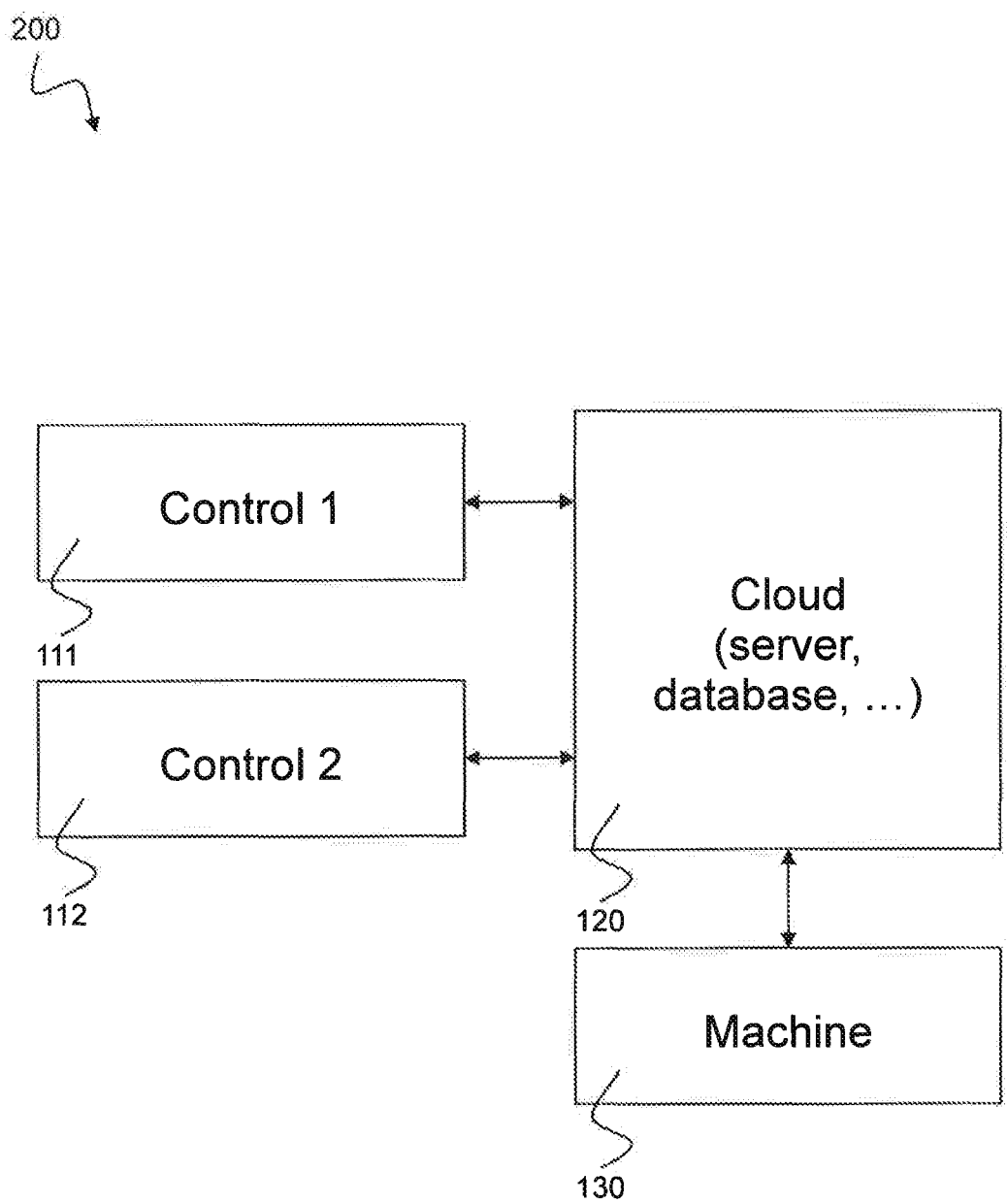
FIG. 2 is a schematic illustration of a multi-channel control system 200 of spatially distributed machines according to one example.

FIG. 2 shows a schematic illustration of a multi-channel control system 200 of spatially distributed machines with controls 111, 112, a cloud 120 and machine(s) 130 according to one example. The two controls 111, 112 shown in FIG. 2 are intended to be examples. Of course, it goes without saying that more than two controls for controlling the machine(s) 130 can be connected to the cloud 120. The depicted machine 130 is also intended to be an example. It can involve multiple machines or machine components that are controlled via the cloud 120.

A multi-channel architecture can also be built through Cloud 120. Another control 112 can be provided in addition to the control 111, which is likewise connected to the cloud 120 as shown in FIG. 2.

The provisioning server itself can also be multi-channel. Since it can also simultaneously be used for communication with other controls and machines, the outlay for redundancy is only needed once. In the simplest case then, the communication system can be a standard communication or a safe transmission system, e.g. in accordance with the IEC 61784-3 standard.

The controls 111, 112 can be different computer platforms, such as the "Raspberry" or "Arduino" platforms, for example, each of which operates on a single channel basis.

The control values are transmitted to the cloud 120 by the controls 111, 112. The cloud 120 compares the two control values. If they are in agreement, one of the control values is made available for retrieval. Otherwise, retrieval is prevented.

This concept applies analogously to N-channel control with N channels.

The cloud 120 can also synchronise the computer platforms for the output of the control values.

In this way, affordable, single-channel computer platforms can be used for multi-channel control.

The controls 111, 112 can furthermore be operated with open source software.

In one example, the cloud 120 can select the controls 111, 112, for example based on the utilisation of the controls 111, 112. The selected control then transmits the control values to the cloud 120. In this way, due to temporary overload, the degree of redundancy can be reduced temporarily without abandoning the multi-channel control. Thus, in the event of a temporary shutdown of a control, a N-channel control turns into a N−1-channel control.

In one example, for example based on the computational load, the cloud 120 can assign the control tasks to those controls that are less busy. The cloud 120 can furthermore either outsource or partially participate in the processing. Consequently, the existing control resources can be utilised efficiently.

The controls can be distributed and accessible exclusively via a communication network.

In one example, the cloud 120 can provide control resources as an additional redundancy, for example in the event that one of the controls fails. The multi-channel feature is maintained in this case as well.

Figure 3:
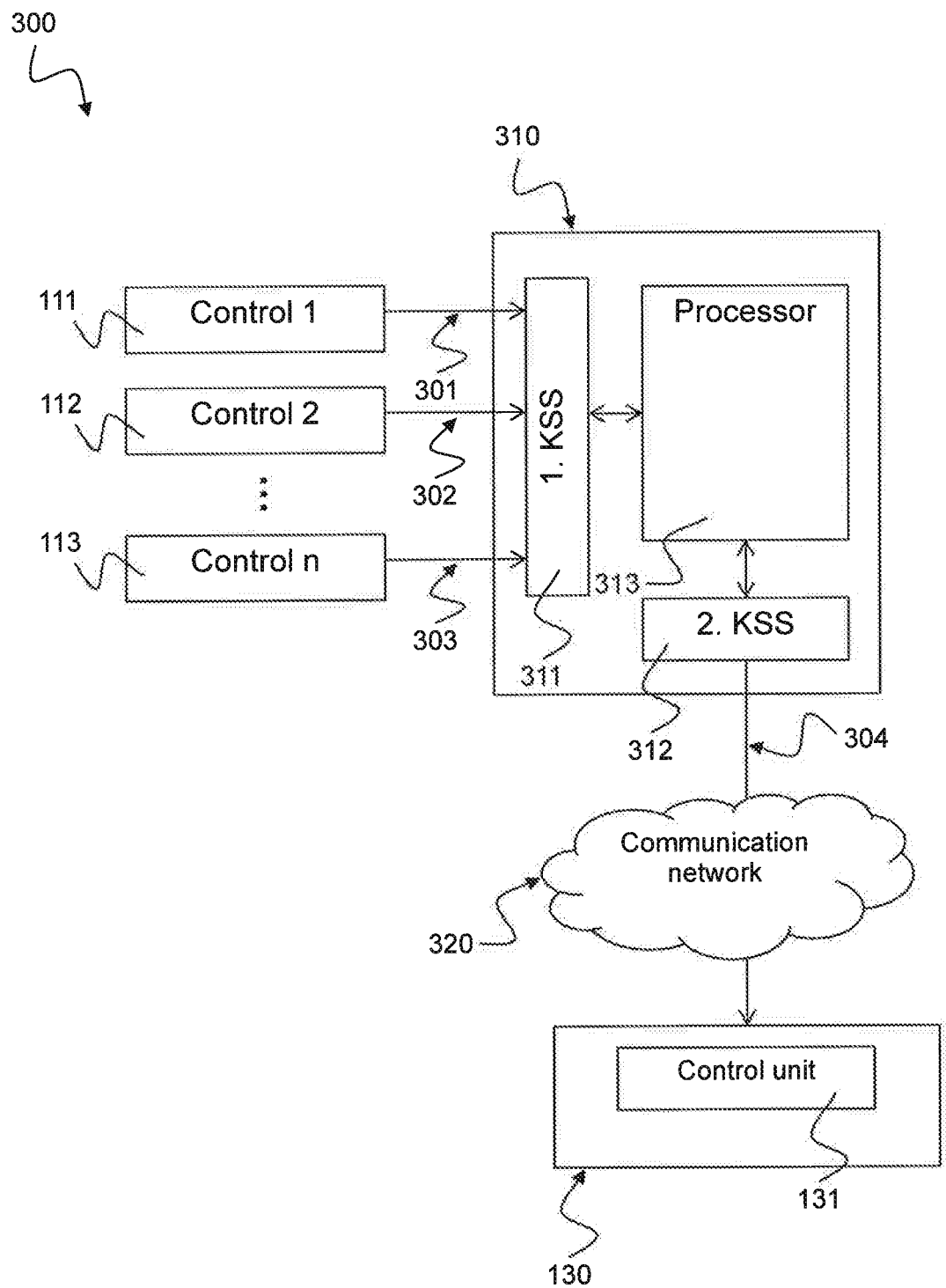
FIG. 3 is a schematic illustration of a control system 300 with a provisioning server 310 according to one example.

FIG. 3 shows a schematic illustration of a control system 300 with a provisioning server 310 according to one example. The control system 300 comprises a plurality of distributed controls 111, 112, 113, a provisioning server 310, to which the controls 111, 112, 113 are connected, a communication network 320, and one or more machines 130 or machine components that are connected to the provisioning server 310 via the communication network 320. The distributed controls 111, 112, 113 are designed to send a plurality of single-channel control parameters 301, 302, 303 to the provisioning server 310.

The provisioning server 310 provides a secured control parameter 304 for multi-channel control of a machine 130, using a plurality of distributed controls 111, 112, 113 that output single-channel control parameters 301, 302, 303. The machine 130 comprises a control unit 131 that generates a control command for controlling the machine 130 on the basis of the secured control parameter 304.

The provisioning server comprises two communication interfaces 311, 312 and a processor 313. It goes without saying that the processor 313 here is merely an example of the hardware necessary to perform the tasks of the provisioning server. Instead of a single processor 313, the provisioning server can also comprise multiple processors, e.g. a multi-processor system, that executes specific tasks of the provisioning server. The first communication interface 311 is designed to receive a plurality of single-channel control parameters 301, 302, 303 from the plurality of distributed controls 111, 112, 113.

At least one processor (e.g. the processor 313 shown in FIG. 3) is designed to compare the received single-channel control parameters 301, 302, 303 with one another and, if a number of the single-channel control parameters 301, 302, 303 are in agreement, output a received control parameter as the secured control parameter 304. A number of single-channel control parameters 301, 302, 303 can be a single or any plurality of the single-channel control parameters 301, 302, 303. The number can also refer to all of the single-channel control parameters.

In examples of the control system 300 that satisfy the SIL 2 or 3 standards, the cloud server can also have a multi-channel structure or can itself coordinate with other provisioning servers.

The second communication interface 312 is designed to send the secured control parameter 304 to the machine 130 via a communication network 320.

In one example, the processor 313 is designed to output a received control parameter as the secured control parameter 304 if all the single-channel control parameters 301, 302, 303 are in agreement. Alternatively, the number of single-channel control parameters 301, 302, 303 that have to be the same can be predetermined by a specified threshold value, in particular percent threshold value.

In one example, the first communication interface 311 can be a wired communication interface having connection ports, in particular USB ports, to connect the plurality of distributed controls (111, 112, 113). Alternatively, the first communication interface 311 can be a wireless communication interface for wireless communication with the distributed controls 111, 112, 113 via a communication network, in particular via the communication network 320.

In one example, the second communication interface 312 is designed to receive a request signal to send the secured control parameter 304 from the machine 130 via the communication network 320 and, in response to receiving the request signal, send the secured control parameter 304 to the machine 130 via the communication network 320.

In one example, the second communication interface 312 can be designed to send a provisioning signal to the machine 130, which indicates the provisioning of the secured control parameter 304.

In one example, the second communication interface 312 can be a wireless communication interface or a wired communication interface, e.g. Ethernet, LAN, etc.

In one example, the plurality of distributed controls 111, 112, 113 can include one or more Arduino PCs or Raspberry Pi processors to provide the plurality of single-channel control parameters 301, 302, 303.

In one example, the processor 313 can be designed to transmit a message to a diagnostic device if there is no agreement among a number of the single-channel control parameters 301, 302, 303.

In one example, the first communication interface 311 can be designed to receive the plurality of single-channel control parameters 301, 302, 303 from the plurality of distributed controls 111, 112, 113 over a specified reception time window.

In one example, the plurality of distributed controls 111, 112, 113 can be assigned to different computer platforms and coupled to the first communication interface 311 in an interchangeable manner.

In one example, the processor 313 can be designed to decouple the associated controls from the first communication interface 311 if there is no agreement among a number of the single-channel control parameters 301, 302, 303 and replace them with other controls.

In one example, the plurality of distributed controls 111, 112, 113 can have a safety-relevant operating system which satisfies a safety standard, in particular the IEC 61131-2 standard, whereby the safety standard protects the distributed controls 111, 112, 113 from interference, polarity reversals and/or electrical surges.

In one example, the plurality of distributed controls 111, 112, 113 can be realised on the basis of mobile phone hardware or realised as mobile communication terminals.

A variety of inexpensive control platforms are currently known and are becoming ever more popular. At least the Arduino PC and the Raspberry Pi should be mentioned here. Neither platform is intended for safety engineering, but the structure of both is completely diversitary. Each platform receives a program for controlling safety-relevant applications that can solve said same safety-relevant task. The controls 111, 112, 113 can be based on such control platforms.

The two (or even multiple) platforms can be synchronised with one another, so that, prior to outputting an output value, initial values can be compared to one another at different points in the program sequence. If only one output of one computer platform differs from that of the other computer platform(s), an output of the value is prevented. Such a synchronisation can take place in the processor 313 of the provisioning server 310.

In response to this error, it is possible to restart the program sequence, identify the error by means of a diagnostic device and either interrupt the processing or remedy the error. The advantage of this architecture substantially consists of being able to use already developed, inexpensive computer platforms to control safety-relevant processes via the provisioning server 310, which can be installed in the cloud.

A safety-oriented real-time operating system can furthermore be installed on at least one of the platforms, i.e. one of the controls 111, 112, 113. A safety-relevant Linux operating system is available in the OSADL, a user group for open source software in Germany, which can easily be ported to the mentioned computer platforms because both are already equipped with a Linux operating system. This makes it possible to also cover higher SILs, i.e. safety-relevant requirements. Two homogeneous redundant computer platforms (e.g. the computer platforms for the controls 111, 112, 113) can then work with a safe operating system, which would eliminate, or at least be equivalent to, the need for diversitarily redundant computer platforms.

The principle can generally also be used for the combination of entirely different computer platforms. A combination of control-capable components for the controls 111, 112, 113, which operate on the basis of Android or iOS, is therefore also possible. Safe controls based on mobile phone hardware can thus be realised as well. Again, only one task-identical safety application has to be installed (e.g. via the provisioning server 310), that is also set up for the synchronisation of the link results of the two platforms.

In one example, the computer platforms satisfy the IEC 61131-2 safety standard, as a result of which said platforms are substantially protected against interference, polarity reversals or electrical surges. Operation can also take place in an extended temperature range from −40 to 50° C. at a relative humidity of up to 80 percent.

The two computer platforms can communicate with one another over large distances via a cloud or store their recorded process data and/or diagnostic data there for the other controls, as shown in FIG. 3, in which the provisioning server 310 can be installed in the cloud. An impending failure can thus be detected in time centrally or decentrally by analysing the data, and countermeasures can be initiated.

Therefore, with the architecture according to FIG. 3, a redundancy concept in which multiple computer platforms are connected to one another via the cloud can be created, as a result of which they can all access the same data (hot and/or cold standby). If such a computer platform fails, one of the other ones can take over its tasks.

In one example, a load determination, i.e. how busy a computer platform or control 111, 112, 113 currently is, can be used to achieve an adjusted load distribution, in which tasks are taken away from the computer platform or control on the verge of an overload situation and transferred to another computer platform or control. This is easier, if the input and output modules or the communication interfaces 311 are wirelessly connected to the computer platform or control 111, 112, 113 and said modules allow a control of different computer platforms (multi-slave). In the event of a failure or in response to a specific message, the I/O modules are then flexibly assigned to a different control platform. Time sharing can also take place, so that access to the mobile I/O devices follows a specified pattern (time slices, token mechanisms, etc.).

One of the main advantages lies in that such a computer platform is significantly more flexible than proprietary safety controls with a proprietary operating system. As a result of the consistent use of Linux both as the standard and as the safety version, scalable safety controls, which respond to the ever-increasing number of modules for this platform in an ever more flexible manner, can be realised in an extremely inexpensive way.

Another advantage is that the hardware itself does not have to undergo a complex test. Diversitary redundancy can be used or the computers can be equipped with a safe Linux operating system. The two computer platforms can then also be homogeneously redundant, because the safety Linux can also take over the test of the non-safety-relevant hardware platform. The safety requirement SIL 2 can thus already be achieved with the diversitarily redundant synchronised standard controls, provided that the platforms meet the IEC 61131-2 requirements.

Figure 4:
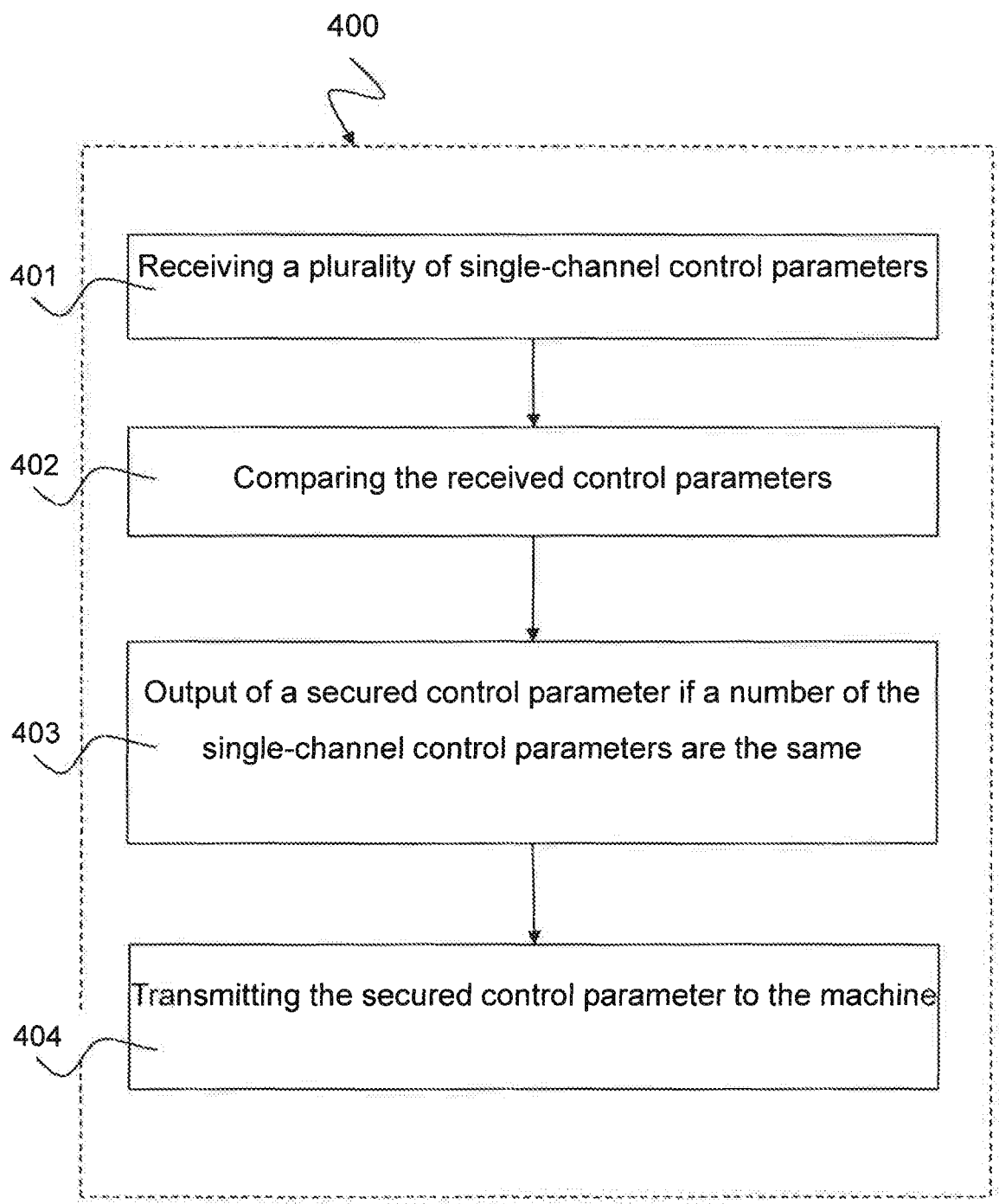
FIG. 4 is a schematic illustration of a method 400 for transmitting a secured control parameter to a machine via a communication network.

FIG. 4 is a schematic illustration of a method 400 for transmitting a secured control parameter 304 to a machine 130 via a communication network 320.

The method 400 comprises the following steps: receiving 401 a plurality of single-channel control parameters 301, 302, 303 from a plurality of distributed controls 111, 112, 113, as described in FIG. 3; comparing 402 the received single-channel control parameters 301, 302, 303 with one another; output 403 of a secured control parameter 304 if a number of the single-channel control parameters 301, 302, 303 are in agreement; and transmission 404 of the secured control parameter 304 to a machine 130 via a communication network 320.

LIST OF REFERENCE NUMBERS

100 Control system
110 Control
120 Cloud, e.g. server, database, etc.
130 Machine
200 Control system
111 Control 1
112 Control 2
300 Control system
113 Control n
310 Provisioning server
301 Single-channel control parameters
302 Single-channel control parameters
303 Single-channel control parameters
311 First communication interface
312 Second communication interface
313 Processor
304 Secured control parameter
320 Communication network
131 Control unit
400 Method for transmitting a secured control parameter
401 Receiving first control parameters
402 Receiving second control parameters
403 Comparing
404 Transmitting

The invention claimed is:

1. A provisioning server for providing a secured control parameter in connection with a safety process for multi-channel control of a machine, comprising:
 a first communication interface configured to receive a plurality of single-channel control parameters from a plurality of distributed controls, wherein the plurality of distributed controls are diverse redundancy controls;
 a processor configured to compare the received single-channel control parameters and output one of the received control parameters as the secured control parameter in connection with the safety process if a threshold number of the single-channel control parameters are in agreement, wherein the received single-channel control parameters are processed and compared in synchronization such that the safety process is unaffected by at least a first occurring error in the received control parameters; and
 a second communication interface configured to send the secured control parameter to the machine via a communication network.

2. The provisioning server according to claim 1, wherein the processor is further configured to output the one of the received control parameters as the secured control parameter if all the single-channel control parameters are in agreement.

3. The provisioning server according to claim 1, wherein the threshold number is defined as a given percentage of the plurality of single-channel control parameters that are the same.

4. The provisioning server according to claim 1, wherein the first communication interface comprises one or more of: a wired communication interface having connection ports configured to connect the plurality of distributed controls or a wireless communication interface for wireless communication with the distributed controls via the communication network.

5. The provisioning server according to claim 1, wherein the second communication interface is configured to receive a request signal to send the secured control parameter from the machine via the communication network and, in response to receiving the request signal, send the secured control parameter to the machine via the communication network.

6. The provisioning server according to claim 1, wherein the second communication interface is configured to send a provisioning signal to the machine, wherein the provisioning signal indicates a provisioning of the secured control parameter.

7. The provisioning server according to claim 1, wherein the second communication interface comprises one or more of: a wireless communication interface or a wired communication interface.

8. The provisioning server according to claim 1, wherein the plurality of distributed controls includes an Arduino processor or a Raspberry Pi processor configured to provide the plurality of single-channel control parameters.

9. The provisioning server according to claim 1, wherein the processor is configured to transmit a message to a diagnostic device if there is no agreement among a threshold number of the single-channel control parameters.

10. The provisioning server according to claim 1, wherein the first communication interface is configured to receive the plurality of single-channel control parameters from the plurality of distributed controls over a specified reception time window.

11. The provisioning server according to claim 1, wherein the plurality of distributed controls are assigned to different computer platforms and coupled to the first communication interface interchangeably.

12. The provisioning server according to claim 1, wherein the processor is configured to decouple the associated controls from the first communication interface if there is no agreement among a threshold number of the single-channel control parameters, and replace the associated controls with an alternative set of associated controls.

13. The provisioning server according to claim 1, wherein the plurality of distributed controls comprise a safety-relevant operating system configured to satisfy International Electrotechnical Commission (IEC) standard 61131-2 with respect to interference immunity and errors.

14. The provisioning server according to claim 13, wherein the plurality of distributed controls is implemented using mobile phone hardware or as mobile communication terminals, or wherein the plurality of distributed controls are configured to connect with mobile communication terminals.

15. A control system, comprising:
   a plurality of distributed controls configured to send a plurality of single-channel control parameters, wherein the plurality of distributed controls are diverse redundancy controls; and
   a provisioning server, comprising:
      a first communication interface configured to receive the plurality of single-channel control parameters from the plurality of distributed controls;
      a processor configured to compare the received single-channel control parameters and output one of the received control parameters in connection with a safety process as a secured control parameter if a threshold number of the single-channel control parameters are in agreement, wherein the received single-channel control parameters are processed and compared in synchronization such that the safety process of the provisioning server is unaffected by at least a first occurring error in the received control parameters; and
      a second communication interface configured to send the secured control parameter to a machine via a communication network.

16. The control system according to claim 15, wherein the processor of the provisioning server is further configured to output the one of the received control parameters as the secured control parameter if all the single-channel control parameters are in agreement.

17. The control system according to claim 15, wherein the threshold number is defined as a given percentage of the number of single-channel control parameters that are the same.

18. The control system according to claim 15, wherein the first communication interface of the provisioning server comprises one or more of: a wired communication interface having connection ports configured to connect the plurality of distributed controls or a wireless communication interface for wireless communication with the distributed controls via the communication network.

19. The control system according to claim 15, wherein the second communication interface of the provisioning server is configured to receive a request signal to send the secured control parameter from the machine via the communication network and, in response to receiving the request signal, send the secured control parameter to the machine via the communication network.

20. A method for transmitting a secured control parameter to a machine via a communication network in connection with a safety process, comprising:
   receiving a plurality of single-channel control parameters from a plurality of distributed controls, wherein the plurality of distributed controls are diverse redundancy controls;
   processing and comparing the received single-channel control parameters;
   outputting one of the received single-channel control parameters as the secured control parameter in connection with the safety process if a threshold number of the single-channel control parameters are in agreement, wherein the received single-channel control parameters are processed and compared in synchronization such that the safe process is unaffected by at least a first occurring error in the received control parameters; and
   transmitting the secured control parameter to the machine via a communication network.

* * * * *